(12) United States Patent
Hamada et al.

(10) Patent No.: US 6,277,924 B1
(45) Date of Patent: *Aug. 21, 2001

(54) SOLID GOLF BALL

(75) Inventors: Akihiko Hamada, Kakogawa; Kiyoto Maruoka, Kobe, both of (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/412,188

(22) Filed: Mar. 28, 1995

(30) Foreign Application Priority Data

Mar. 28, 1994 (JP) .................................... 6-082201

(51) Int. Cl.⁷ .................................................. C08F 132/00
(52) U.S. Cl. .................................. 525/332.3; 260/998.14; 273/DIG. 10; 473/372; 525/359.5; 525/359.6; 525/355; 525/370; 525/331.9; 525/332.5; 525/333.2
(58) Field of Search ................................. 525/274, 333.2, 525/263, 373, 359.5, 359.6, 331.9, 332.3, 332.5, 355, 370; 260/998.14; 473/372; 273/DIG. 10

(56) References Cited

U.S. PATENT DOCUMENTS

| | | | |
|---|---|---|---|
| 4,026,865 | * 5/1977 | Uraneck et al. | 260/42.32 |
| 4,056,269 | * 11/1977 | Pollitt et al. | 525/274 |
| 4,266,772 | * 5/1981 | Martain et al. | 525/274 |
| 4,812,525 | * 3/1989 | Oshima et al. | 525/232 |
| 4,929,678 | * 5/1990 | Hamada et al. | 525/193 |
| 4,990,573 | * 2/1991 | Andreyssi et al. | 525/333.2 |
| 5,017,636 | * 5/1991 | Hattori et al. | 524/300 |
| 5,064,910 | * 11/1991 | Hattori et al. | 525/359.1 |
| 5,115,006 | * 5/1992 | Watanabe et al. | 524/251 |
| 5,268,439 | * 12/1993 | Hergenrother et al. | 526/340 |

* cited by examiner

Primary Examiner—Judy M. Reddick
(74) Attorney, Agent, or Firm—Birch, Stewart, Kolasch & Birch, LLP

(57) ABSTRACT

The present invention provides a solid golf ball which attains long flying distance and is superior in hit feeling and durability. The present invention provides a solid golf ball in which at least a portion thereof is made of rubber, wherein the rubber portion is a crosslinked, molded rubber composition comprising a base rubber, a co-crosslinking agent and peroxides, the base rubber comprising a polybutadiene modified with a tin compound and having a cis content of 40% or more.

3 Claims, 3 Drawing Sheets

SOLID GOLF BALL

FIELD OF THE INVENTION

The present invention relates to a solid golf ball. More particularly, It relates to a solid golf ball which attains a long flying distance and is superior in hit feeling and durability.

BACKGROUND OF THE INVENTION

Generally, golf balls are roughly classified into a thread wound golf ball and a solid golf ball. The thread wound golf ball is produced by winding a thread rubber onto a liquid center comprising a liquid enclosed in a rubber ball or a solid center comprising a crosslinked molded article of a rubber composition at a highly stretched condition to form a thread wound core and then covering the thread wound core with a cover. The solid golf bail includes two-piece solid golf balls or three piece golf balls, produced by covering a solid core comprising a crosslinked molded article having a one- or two-layer structure with a cover, and a one-piece solid golf ball comprising an integrally molded crosslinked article of a rubber composition.

Among them, the two-piece and three-piece solid golf balls have recently, exclusively been used as a golf ball because of there particular long flying distance.

However, the two-piece and three-piece solid golf balls have a drawback in that the hit feeling is hard and inferior in comparison with the thread wound golf ball.

Therefore, in order to improve the drawback of the two-piece and three-piece solid golf balls, a trial of softening the core which makes the ball softer towards its center to increase deformation of the golf ball upon hitting have been studied (e.g. Japanese Laid-Open Patent Publication No. 4 (1992)-109971, etc.).

However, the durability and resilient performances (flying distance) are deteriorated by softening the core.

On the other hand, the one-piece golf ball is mainly used as the golf ball for driving ranges, and in such use, cracking and chipping of the ball surface tend to be caused by repeated hitting in this application. Therefore, excellent durability is particularly necessary for the one-piece golf ball.

OBJECT OF THE INVENTION

As described above, an improvement in the flying distance, hit feeling and durability is requested for the two-piece and three-piece solid golf balls and an improvement in durability is particularly desired for the one-piece solid golf ball.

In order to solve the above problem, the present inventors have paid attention to a base rubber constituting the rubber portions of the solid golf ball. As a result, it has been found that a solid golf ball, which attains a large flying distance and is superior in hit feeling and durability, can be obtained by using polybutadiene, modified with a tin compound, which has a cis content of 40% or more.

The main object of the present invention is to provide a solid golf ball which attains a large flying distance and is superior in hit feeling and durability.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawing which are given by way of illustration only, and thus, are not limitative of the present invention, and wherein.

SUMMARY OF THE INVENTION

Figure 1:
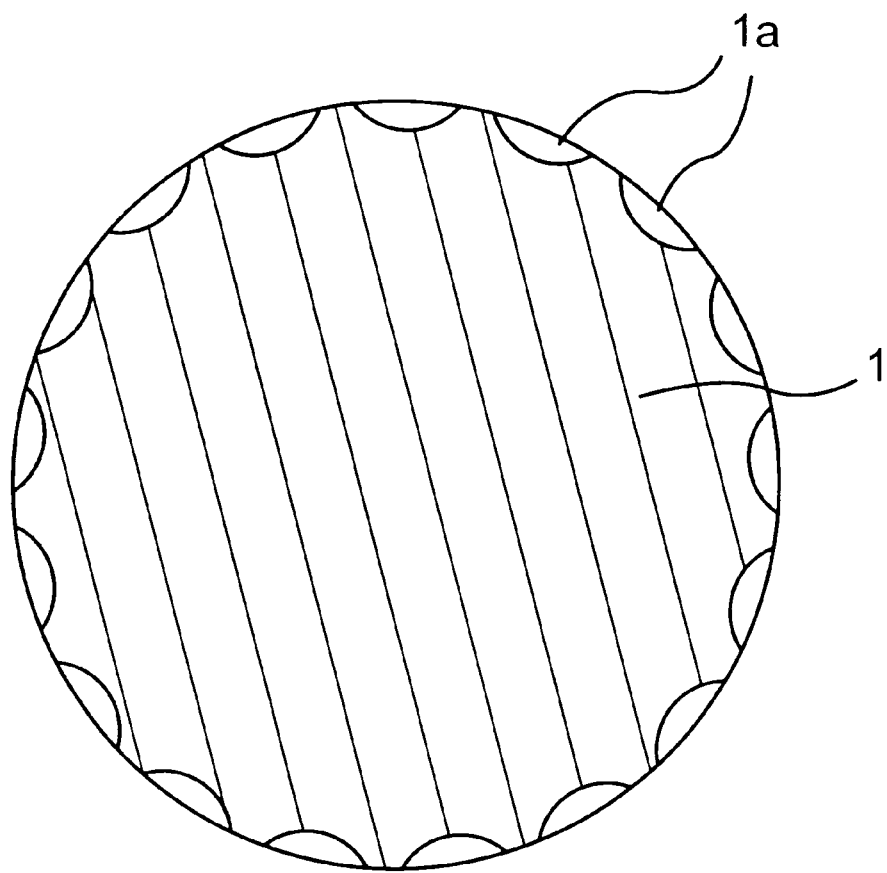
FIG. 1 is a schematic cross section illustrating one embodiment of a one-piece solid golf ball of the present invention.

The present invention provides a solid golf ball of which at least a portion is made of rubber, wherein the rubber portion is a crosslinked molded article of a rubber composition comprising a base rubber, a co-crosslinking agent and peroxides, the base rubber comprising a polybutadiene modified with a tin compound and having a cis content of 40% or more.

DETAILED DESCRIPTION OF THE INVENTION

In the present invention, the rubber portion of the above construction normally constitutes a core in the two-piece solid golf ball, constitutes an inner core and/or an outer layer in the three-piece solid golf ball or constitutes a one-piece solid golf ball.

In the present invention, the strength characteristics of the rubber portion are improved by polybutadiene modified with the tin compound, which is the main component of the base rubber, and the affinity with the co-crosslinking agent is improved. Therefore, it is considered that a solid golf bail having an excellent durability can be obtained even if It is softened in comparison with a conventional solid golf ball.

Also It is considered that high resilient performances are obtained because the rubber elasticity of polybutadiene modified with the tin compound is high, thereby accomplishing an improvement in the flying distance.

The modification of polybutadiene with the tin compound is conducted, for example, by adding the tin compound to the rubber solution after polymerization and subjecting it to a heat treatment.

It is necessary that the polybutadiene to be modified with the tin compound has a high cis content and an active molecular terminal, and has reactivity with the tin compound. As such polybutadiene, polybutadiene having an active terminal, which exhibits a pseudo-living polymerizability and is polymerized with a catalyst of rare earth elements (e.g. neodymium, etc.) to produce a polymerized product having a high cis-1,4 content, is preferred.

Examples of the tin compound used for the modification of polybutadiene include chlorides of tin compound, such as for example triphenyltin chloride, diphenyltin chloride, phenyltin trichloride and the like.

The outline of the synthetic process of polybutadlene modified with the tin compound, which has a cis content of 40% or more, will be explained below but the synthetic process is not limited to the following.

Firstly, 0.5 kg of a butadiene monomer and 2.5 kg of cyclohexane are charged into a 5 liter reaction vessel equipped with a stirrer. To the mixed solution, a catalyst solution of neodymium and 2-ethylhexanoate/acetylacetone/ cyclohexane (1/2/4 (molar ratio)) (hereinafter abbreviated to "NdAc"), trilsobutyl aluminum (hereinafter abbreviated to "TIBA"), diisobutyl aluminum hydride (hereinafter abbreviated to "DBIAH"), ethyl aluminum sesquichloride (hereinafter abbreviated to "EASC") and a butadiene monomer (hereinafter abbreviated to "Bd") is added.

The amount of the catalyst solution is the following proportion (molar ratio) based on the amount of the butadiene monomer to be charged.

(Butadiene monomer to be charged)/(NdAc/TIBA/DBIAH/EASC/Bd)=(1000)/(1/12/28/2/5)

Then, the mixture is polymerized at 75° C. for 1.5 hours in a nitrogen atmosphere, and the resulting polymerized mixture is cooled to 60° C. and a tin compound is added, followed by stirring for 30 minutes. Finally, 3 g of an antioxidant (2,5-t-butyl-p-cresol) is added and steam is bubbled into the vessel to solidify the mixture, followed by drying to give the desired polybutadiene modified with the tin compound.

It is preferred that the polybutadiene modified with the tin compound has a cis-1,4 bond of 40% or more, particularly 80% or more, in view of the disired high resilient performance. Further, it is preferred that the Mooney viscosity $ML_{1+4}$ (100° C.) of the polybutadiene is within the range of 20 to 80, particularly 30 to 65.

The amount of tin to be bonded to polybutadiene is preferably about 100 to 5,000 ppm (weight basis) in polybutadiene. When it is smaller than 100 ppm, the modification effect is low. On the other hand, when it is larger than 5,000 ppm, the gel content is liable to be formed.

As the base rubber in the rubber composition, there can be used those which are obtained by blending (mixing) the above polybutadiene modified with tin compound with normal non-modified polybutadiene, styrene-butadiene rubber (SBR), natural rubber, synthetic polyisoprene rubber, and ethylene-propylene-diene rubber (EPDM). It is preferred that the base rubber contains not less than 50% by weight of polybutadiene rubber modified with tin compound.

The co-crosslinking agent formulated in the rubber composition is preferably monovalent or divalent metal salts of α, β-ethylenically unsaturated carboxylic acids, and examples thereof include zinc diacrylate, basic zinc methacrylate, zinc dimethacrylate and the like. These metal salts of α, β-ethylenically unsaturated carboxylic acids may be mixed with the base rubber as they are according to a normal method, or α, β-ethylenically unsaturated carboxylic acids (e.g. acrylic acid, methacrylic acid, etc.) are added in a rubber composition which has been kneaded with metal oxides (e.g. zinc oxide, etc.) in advance and the mixture was kneaded to react the α, β-ethylenically unsaturated carboxylic acid with the metal oxide in the rubber composition to give metal salts of α, β-ethylenically unsaturated carboxylic acids.

The amount of the co-crosslinking agent is not specifically limited, and is normally 10 to 70 parts by weight, based on 100 parts by weight of the base rubber. When the amount of the co-crosslinking agent is smaller than the above range, the crosslinking reaction does not proceed sufficiently. As a result, the resilient performance are deteriorates, and the flying distance and the durability become inferior. On the other hand, when the amount of the co-crosslinking agent is larger than the above range, the hit feeling is inferior because the compression is too large.

In the present invention, peroxides are formulated in the rubber composition constituting the rubber portion, in addition to the above co-crosslinking agent.

These peroxides act as an initiator for the crosslinking reaction, graft reaction, and polymerization between the rubber and the co-crosslinking. Examples thereof include dicumyl peroxide, 1,1-bis(t-butylperoxy)3,3,5-trimethylcyclohexane and the like.

The amount of the peroxides is preferably 0.2 to 5 parts by weight, based on 100 parts by weight of the base rubber. When the amount of the peroxides is smaller than the above range, the crosslinking reaction does not proceed sufficiently. As a result, the resilient performances are deteriorated, and the flying distance and the durability become inferior. On the other hand, when the amount of the peroxides is larger than the above range, the durability becomes inferior because the rubber composition becomes brittle by overcuring.

Zinc oxides, which also act as a crosslinking auxiliary when using zinc diacrylate or zinc dimethacrylate as the co-crosslinking agent, may be formulated in the rubber composition and, if necessary, fillers (e.g. barium sulfate, etc.), antioxidants, additives (e.g. zinc stearate, etc.) may be formulated.

Hereinafter, a typical example of the solid golf ball to which the present invention is applied will be explained with reference to the accompanying drawings.

FIG. 1 is a schematic cross section illustrating a one-piece solid golf ball. In FIG. 1, 1 is a golf ball and 1a is a dimple, and the rubber portion (i.e. rubber portion comprising the crosslinked molded article of the rubber composition containing polybutadlene modified with tin compound as the main component of the base rubber) constitutes the golf ball 1 in this one-piece solid golf ball.

Figure 2:
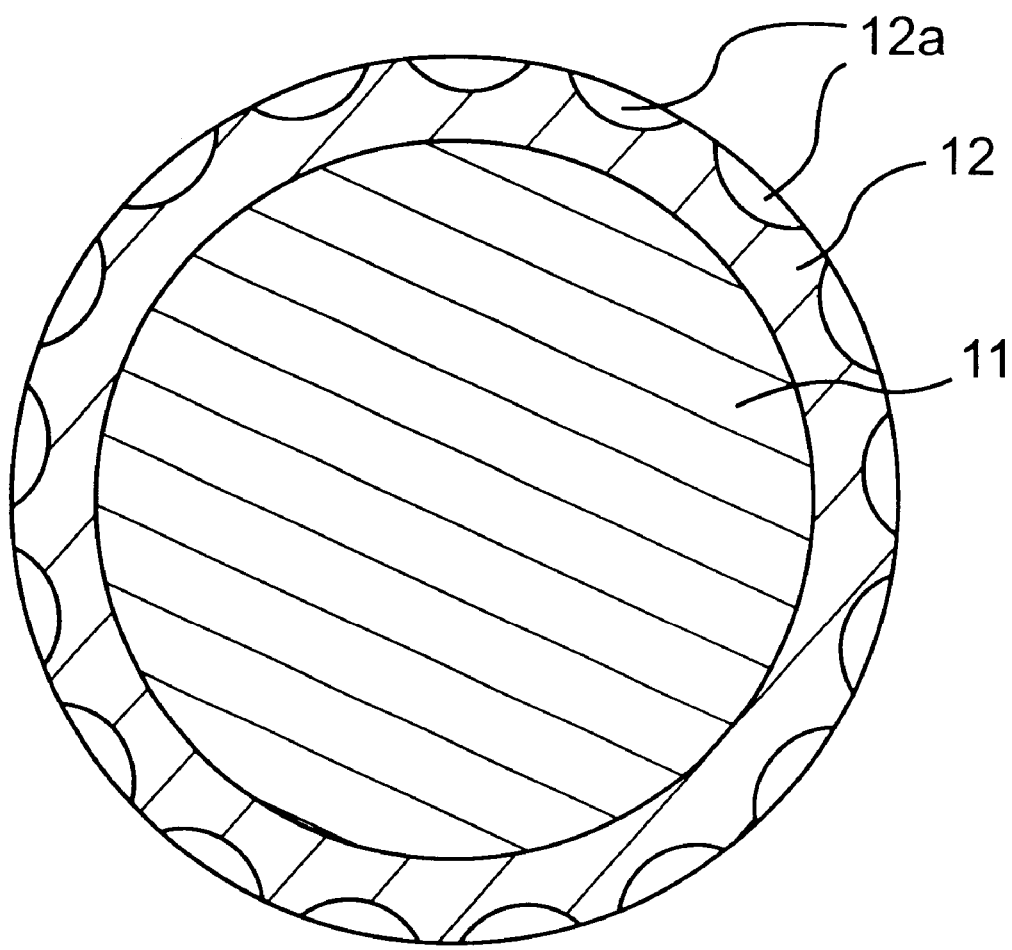
FIG. 2 is a schematic cross section illustrating one embodiment of a two-piece solid god ball of the present invention.

FIG. 2 is a schematic cross section illustrating a two-piece solid golf ball. In FIG. 2, 11 is a core and 12 is a cover, and the core 11 is covered with the cover 12. Further, 12a is a dimple In this two-piece solid golf ball, the rubber portion (i.e. rubber part comprising the crosslinked molded article of the rubber composition containing polybutadiene modified with the tin compound as the main component of the base rubber) constitutes the core 11.

Figure 3:
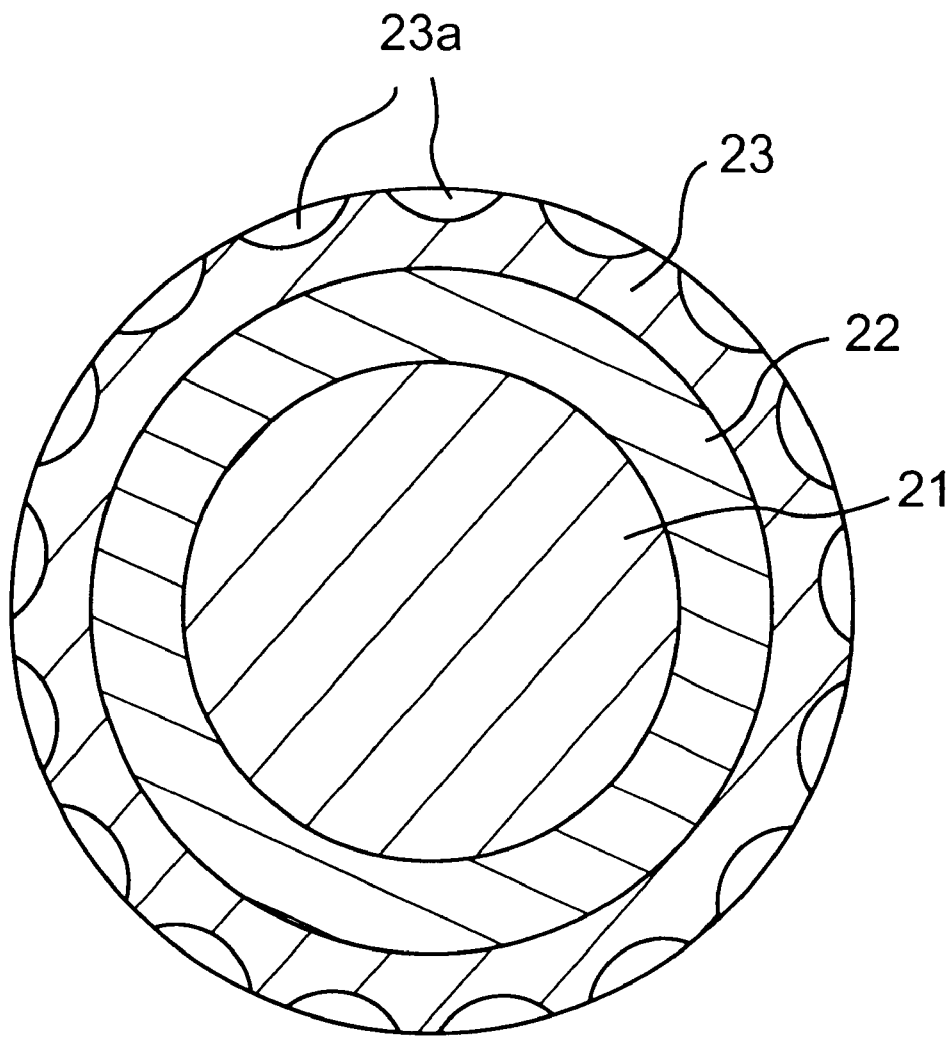
FIG. 3 is a schematic cross section illustrating one embodiment of a three-piece solid golf ball of the present invention.

FIG. 3 is a schematic cross section illustrating a three-piece solid golf ball. In FIG. 3, 21 is an inner core, 22 is an outer layer, 23 is a cover and 23a is a dimple.

In this three-piece solid golf ball, the outer layer 22 is formed on the outer surface of the inner core 21, and the inner core 21 and the outer layer 22 constitute a so-called solid core and, further, the outer layer 22 of the solid core is covered with the cover 23.

In this three-piece solid golf ball, the rubber portion (i.e. rubber part comprising the crosslinked molded article of the rubber composition containing polybutadiene modified with tin compound as the main component of the base rubber) constitutes the inner core 21 and/or the outer layer 22.

In the one-piece solid golf ball shown in FIG. 1, two-piece solid golf ball shown in FIG. 2 and three-piece solid golf ball shown in FIG. 3, the dimple 1a, dimple 12a and dimple 23a are optionally provided on the outer peripheral part of the solid golf ball in suitable numbers and embodiments according to desired characteristics, respectively. In the one-piece solid golf ball shown in FIG. 1, the dimple 1a is formed on the outer peripheral part of the golf ball 1. In the two-piece solid golf ball shown in FIG. 2, the dimple 12a is formed on the outer peripheral part of the cover 12. In the three-piece solid golf ball shown in FIG. 3, the dimple 23a is provided on the outer peripheral part of the cover 23.

In these solid golf balls, painting or marking are provided, if necessary.

Hereinafter, a typical process for producing the solid golf ball of the present invention will be explained.

Firstly, the one-piece solid golf ball itself, the core of the two-piece solid golf ball and the inner core of the three-piece solid golf ball are produced by forming a rubber composition containing polybutadiene modified with the tin compound as the main component, putting it in a mold and subjecting it to a crosslinking molding using a press. It is preferred that the crosslinking reaction is conducted at a temperature of 130 to 180° C. for 10 to 50 minutes. The temperature at the time of the crosslinking is not necessarily constant and, it may be changed in two or more stages.

In the three-piece golf ball, a sheet having a desired thickness prepared by molding a rubber composition for the outer layer is covered on the inner core obtained above, which is then subjected to a crosslinking molding using a press to form a solid core having a two-layer structure. The formation of the solid core is not limited to that mentioned above, but can be conducted by a method wherein two half-shells of a rubber composition are formed and covered on the inner core, or a method of injection molding, etc.

The cover of the two-piece solid golf balls or three-piece solid golf ball is formed by covering the solid core with a cover composition. The cover composition generally comprises a resin component mainly composed of an ionomer resin, and if necessary some additives such as inorganic pigments (e.f. titanium dioxide, etc.), photostabilizers, and the like. Covering may be generally conducted by an injection molding method, but is not specifically limited thereto.

In the one-piece solid golf ball, desired dimples may be formed on the surface when molding the one-piece solid golf ball. In the two-piece and three-piece solid golf balls, desired dimples may generally be formed when the cover is molded. Further, paint and marking may be provided on the solid golf balls after molding to finish the golf ball. In the three-piece solid golf ball, either the outer layer or the inner core or the both are prepared from a rubber composition containing polybutadiene modified with the tin compound.

As described above, the solid golf bail of the present invention attains long flying distance and is superior in hit feeling and durability

EXAMPLES

The following Examples and Comparative Examples further illustrate the present invention in detail but are not to be construed to limit the present invention to their details thereof.

Examples 1 to 4 and Comparative Examples 1 to 3

Firstly, trade names and Mooney viscosity $ML_{1+4}$ (100° C.) of polybutadienes used in Examples and Comparative Examples, kinds of polymerization catalyst used in the polymerization of polybutadiene, cis-1,4 contents of polybutadiene and amounts of tin to be bonded to polybutadiene are shown in Table 1.

In Table 1, the polybutadiene modified with the tin compound is abbreviated to "tin-modified polybutadiene".

TABLE 1

|  | [A] | [B] | [C] | [D] |
|---|---|---|---|---|
| Polybutadiene | Tin-modified polybutadiene (test product 1) | Tin-modified polybutadiene (test product 2) | Neocis BR40 (Trade name) | BR-11 (Trade name) |
| Manufacturer | Nihon Gosei Gomu Co., Ltd. (trial product) | Laboratory synthesis (trial product) ※1 | Enikem Elastomers (England) | Nihon Gosei Gomu Co., Ltd. |
| Polymerization catalyst | Neodymium catalyst | Neodymium catalyst | Neodymium catalyst | Nickel catalyst |
| Mooney viscosity | 33 | 42 | 43 | 43 |
| Cis-1,4 content (%) | 98 | 98 | 98 | 97.5 |
| Amount of tin to be bonded (ppm) | 250 | 700 | 0 | 0 |

※1: The laboratory synthesis means that the present inventors have synthesized in the laboratory and the trial product is obtained by adding polybutadiene modified by adding 40 mmol of triphenyl tin chloride as the tin compound per 1 mol of butadiene, followed by reacting the materials.

Then, various polybutadienes shown in Table 1 were kneaded with zinc diacrylate, zinc oxide, dicumyl peroxide and an antioxidant according to the formulation shown in Table 2, using a roll, and the resulting rubber composition was subjected to crosslinking molding under pressure at 150° C. for 30 minutes to give a core of 38.5 mm in diameter.

In Table 2, the tin-modified polybutadiene (test product 1) is represented by "tin-modified test product 1" and the tin-modified polybutadiene (test product 2) is represented by "tin-modified test product 2", respectively, due to lack of space. As is apparent form these descriptions, the "tin-modified test product 1" is a trial product of polybutadiene modified with the tin compound manufactured by Japan Synthetic Rubber Co., Ltd., and the "tin-modified test product 2" is a trial product of polybutadiene modified with the tin compound synthesized by the present inventors in the laboratory.

Hereinafter, the Comparative Examples will be explained. The golf balls of Comparative Examples 1 and 2 are produced with the intent to improve the hit feeling by softening the core to reduce the compression (PGA) of the golf ball. The golf ball of Comparative Example 3 is produced with the intent to provide a conventional two-piece solid golf ball.

TABLE 2

|  | Example No. | | | | Comparative Example No. | | |
|---|---|---|---|---|---|---|---|
|  | 1 | 2 | 3 | 4 | 1 | 2 | 3 |
| Polybutadiene | | | | | | | |
| [A] Tin-modified test product 1 | 100 | 60 | 0 | 0 | 0 | 0 | 0 |
| [B] Tin-modified test product 2 | 0 | 0 | 100 | 60 | 0 | 0 | 0 |
| [C] Neocis BR40 | 0 | 0 | 0 | 0 | 100 | 0 | 0 |
| [D] BR-11 | 0 | 40 | 0 | 40 | 0 | 100 | 100 |
| Zinc diacrylate | 25 | 25 | 25 | 25 | 25 | 25 | 32 |
| Zinc oxide | 22 | 22 | 22 | 22 | 22 | 22 | 19 |
| Dicumyl peroxide | 1.8 | 1.8 | 1.8 | 1.8 | 1.8 | 1.8 | 1.8 |
| Antioxidant ※2 | 0.5 | 0.5 | 0.5 | 0.5 | 0.5 | 0.5 | 0.5 |

※2: Yoshinox 425 (trade name) manufactured by Yoshitomi Seiyaku Co., Ltd.

Then, the core thus obtained as described above was covered with a cover composition composed of a mixture of 100 parts by weight of an ionomer resin and 2 parts by weight of titanium dioxide by means of an injection molding process to prepare a two-piece solid golf ball of 42.7 mm in outer diameter. The ionomer resin used is a mixture of Himilane #1706 (trade name, manufactured by Mitsui Du Pont Polychemical Co.) and Himilane #1605 (trade name, manufactured by Mitsui Du Pont Polychemical Co.) (weight ratio: 50/50).

The weight, the ball compression (PGA indication), the ball initial velocity, the flying distance (carry) and the hammering durability of the two-piece solid golf ball thus obtained as described above were measured. The results are shown in Table 3.

Further, the resulting golf ball was hit with a No. 1 wood club by 10 top professional golfers to examine the hit feeling. The results are also shown in Table 3.

The measuring methods of the ball initial velocity, flying distance and hammering durability as well as the evaluation method of the hit feeling are as follows.

Ball Initial Velocity:

A golf ball was hit at a head speed of 45 m/second using a swing robot manufactured by True Temper Co. equipped with a No. 1 wood club to measure a ball initial velocity.

Flying Distance (carry).

A golf ball was hit at a head speed of 45 m/second using a swing robot manufactured by True Temper Co. equipped with a No. 1 wood club to measure a distance (yard) up to the point where the golf ball was dropped.

Hammering Durability:

A golf ball was in collision with a collision board at a speed of 45 m/second, and the number of times until breakage was arisen was measured. The resulting value was indicated as an index in case of the value of the golf ball of Comparative Example 2 being 100.

Evaluation Method of Hit Feeling:

It is evaluated by a practical hitting test due to 10 top professional golfers. The evaluation was conducted in comparison with the golf ball of Comparative Example 3 as a conventional standard two-piece golf ball. The evaluation criteria are as follows. The results shown in the following Tables are based on the fact that not less than 8 out of 10 professional golfers evaluated with the same criterion about each test item.

Evaluation Criteria:

○: Hit feeling is soft and superior to the golf ball of Comparative Example 3.

Δ: Hit feeling is the same as that of the golf ball of Comparative Example 3.

×: Hit feeling is hard and inferior to the golf ball of Comparative Example 3.

TABLE 3

|  | Example No. | | | | Comparative Example No. | | |
|---|---|---|---|---|---|---|---|
|  | 1 | 2 | 3 | 4 | 1 | 2 | 3 |
| Weight (g) | 45.5 | 45.4 | 45.5 | 45.4 | 45.4 | 45.4 | 45.5 |
| Compression (PGA) | 90 | 90 | 91 | 91 | 89 | 90 | 105 |
| Ball initial velocity (m/second) | 65.5 | 65.4 | 65.5 | 65.4 | 64.9 | 65.0 | 65.6 |
| Flying distance (yard) | 232 | 231 | 232 | 231 | 227 | 227 | 231 |
| Hammering durability (index) | 130 | 125 | 135 | 130 | 95 | 100 | 130 |
| Hit feeling | ○ | ○ | ○ | ○ | ○ | ○ | — |

As is shown in Table 3, the golf balls of Examples 1 to 4 attained a large flying distance and they were superior in durability to those of Comparative Examples 1 and 2. Further, they were superior in hit feeling to that of Comparative Example 3 as a conventional standard two-piece solid golf ball.

Examples 5 to 8 and Comparative Examples 4 to 6

The formulation materials shown in Table 4 were kneaded by a kneader and a roll to prepare a rubber composition and Fe resulting rubber composition was charged in a mold and then subjected to a crosslinking molding under pressure at 168° C. for 25 minutes to prepare a one-piece solid golf ball comprising an integrally molded crosslinked article of 42.7 mm in outer diameter.

TABLE 4

|  | Example No. | | | | Comparative Example No. | | |
|---|---|---|---|---|---|---|---|
|  | 5 | 6 | 7 | 8 | 4 | 5 | 6 |
| Polybutadiene | | | | | | | |
| [A] Tin-modified test product 1 | 100 | 60 | 0 | 0 | 0 | 0 | 0 |
| [B] Tin-modified test product 2 | 0 | 0 | 100 | 60 | 0 | 0 | 0 |
| [C] Neocis BR40 | 0 | 0 | 0 | 0 | 100 | 0 | 0 |
| [D] BR-11 | 0 | 40 | 0 | 40 | 0 | 100 | 100 |
| Methacrylic acid | 23 | 23 | 23 | 23 | 23 | 23 | 25 |
| Zinc oxide | 25 | 25 | 25 | 25 | 25 | 25 | 25 |
| Dicumyl peroxide ※2 | 0.6 | 0.6 | 0.6 | 0.6 | 0.6 | 0.6 | 0.6 |

According to the same manner as that described in Example 1, the weight, the ball compression (PGA), the ball initial velocity, the flying distance (carry) and the hammering durability of the resulting one-piece solid golf ball were measured. The results are shown in Table 5.

The evaluation was conducted in comparison with the golf ball of Comparative Example 6 as a conventional standard one-piece golf ball.

Further, the golf balls of Comparative Examples 4 and 5 are produced with the intent to improve the hit feeling by softening the core to reduce the compression (PGA) of the golf ball.

TABLE 5

|  | Example No. | | | | Comparative Example No. | | |
| --- | --- | --- | --- | --- | --- | --- | --- |
|  | 5 | 6 | 7 | 8 | 4 | 5 | 6 |
| Weight (g) | 45.5 | 45.4 | 45.5 | 45.4 | 45.4 | 45.4 | 45.5 |
| Compression (PGA) | 81 | 80 | 81 | 80 | 78 | 80 | 90 |
| Ball initial velocity (m/second) | 61.6 | 61.5 | 61.6 | 61.5 | 61.1 | 61.2 | 61.6 |
| Flying distance (yard) | 209 | 208 | 209 | 208 | 205 | 205 | 208 |
| Hammering durability (index) | 140 | 135 | 145 | 135 | 97 | 100 | 130 |
| Hit feeling | ○ | ○ | ○ | ○ | ○ | ○ | — |

As shown in Table 5, one-piece solid golf balls of Examples 5 to 8 attained a large flying distance and they were superior in durabilty to those of Comparative Examples 4 and 5. Further, they were superior in hit feeling to that of Comarative Example 6 as a conventional normal one-piece solid golf ball.

What is claimed is:

1. A solid golf ball in which at least a portion thereof is made of rubber, wherein the rubber portion is a crosslinked, molded rubber composition, comprising:

a base rubber, a co-crosslinking agent and a peroxide, wherein the base rubber is comprised of a polybutadiene component having a Mooney viscosity $ML_{1+4}$ (100° C.) of 20 to 80 and a cis content of 40% or more, said polybutadiene component is chemically reacted with 100 to 5,000 ppm of a tin compound, whereby said chemical reaction results in a tin atom directly bonded to the polybutadiene component, and said chemical reaction takes place after the formation of the polybutadiene component.

2. The solid golf ball according to claim 1 wherein the polybutadiene component being reacted with the tin compound is obtained by polymerization in the presence of rare earth element catalyst.

3. The solid golf ball according to claim 1 wherein the tin compound is selected from the group consisting of triphenyltin chloride, diphenyltin chloride, and phenyltin trichloride.

* * * * *